United States Patent
Gatti et al.

(10) Patent No.: US 8,027,154 B2
(45) Date of Patent: Sep. 27, 2011

(54) REPLACEMENT PANEL BOARD AND METHODS FOR SELECTING

(75) Inventors: Rathishchandra Gatti, Karnataka (IN); Peter James Greenwood, Cheshire, CT (US); Bradley E. Parlee, Maitland, FL (US); Veeresh Somalingayya, Karanataka (IN)

(73) Assignee: General Electric Company, Schenectady, NY (US)

( * ) Notice: Subject to any disclaimer, the term of this patent is extended or adjusted under 35 U.S.C. 154(b) by 200 days.

(21) Appl. No.: 12/347,276

(22) Filed: Dec. 31, 2008

(65) Prior Publication Data

US 2010/0165550 A1 Jul. 1, 2010

(51) Int. Cl.
*H02B 1/26* (2006.01)
(52) U.S. Cl. ........ 361/645; 361/636; 361/656; 361/673; 174/50; 174/502
(58) Field of Classification Search .................. 361/614, 361/616, 634, 636, 641, 645, 648, 652, 656–657, 361/664, 673
See application file for complete search history.

(56) References Cited

U.S. PATENT DOCUMENTS

| | | | | |
|---|---|---|---|---|
| 3,215,899 A | * | 11/1965 | Meacham | 361/634 |
| 5,638,256 A | * | 6/1997 | Leach et al. | 361/641 |
| 5,977,492 A | | 11/1999 | Taylor et al. | |
| 6,430,036 B1 | * | 8/2002 | Cornell et al. | 361/648 |
| 7,209,343 B2 | | 4/2007 | Remmert et al. | |
| RE40,354 E | * | 6/2008 | Cornell et al. | 361/648 |
| 7,688,573 B2 | * | 3/2010 | Ranta | 361/645 |
| 7,732,715 B2 | * | 6/2010 | Paolucci | 174/481 |
| 7,764,495 B2 | * | 7/2010 | Hruby et al. | 361/692 |
| 2002/0176222 A1 | | 11/2002 | Foley et al. | |
| 2004/0240159 A1 | | 12/2004 | Gehlbach | |
| 2007/0253181 A1 | * | 11/2007 | Bersiek | 361/828 |

OTHER PUBLICATIONS

Siemens Technical Education Program, Basics of Load Centers and related products, http://www.sea.siemens.com/step/pdfs/load_centers.pdf.

* cited by examiner

*Primary Examiner* — Courtney Smith
(74) *Attorney, Agent, or Firm* — Global Patent Operation; Stephen G. Midgley

(57) ABSTRACT

A panel board retrofit kit, and method of selecting a panelboard retrofit kit, for replacing a panel board having a switching device in an enclosure is disclosed. The panel board retrofit kit has a first dead front plate having a first aperture, and a second dead front plate having a second aperture. The second aperture of the second panel board dead front plate is configurable to overlap at least a portion of said first aperture of said first dead front plate. The disclosed panelboard retrofit kit and method enable replacement of an installed panel board without removing or replacing the panel board enclosure.

7 Claims, 6 Drawing Sheets

REPLACEMENT PANEL BOARD AND METHODS FOR SELECTING

BACKGROUND OF THE INVENTION

1. Field of the Invention

The present disclosure is related panel boards for electric power distribution systems. More particularly, the present disclosure is related to replacement panel boards and methods for selecting replacement installed panel boards.

2. Description of Prior Art

Electrical systems in residential, commercial, and industrial applications usually include a panel board for receiving incoming lines of a distribution system delivering electrical power from a utility source or generator. The power is routed through the panel board via one or more current interrupters, such as circuit breakers, to numerous branch circuits in the system.

Over current protection is typically provided for the branch circuits in older panel boards by fuses and more recently, by circuit breakers. Additional protection, such as surge protection, ground fault protection, and arc fault protection is also provided in some panel boards.

The panel board includes a box-like enclosure with an open front and is usually formed from sheet metal. Typically, a main circuit breaker or main lugs connected in series with separate single or multi-pole circuit breakers for the branch circuits are collectively housed within the panel board enclosure. Each branch circuit breaker distributes the power from a distribution bus to a designated branch, where the branch supplies one or more loads with the power. The circuit breakers are configured to interrupt the power to the designated branch if certain electrical conditions, such as the instantaneous current for example, in that branch reach a predetermined level.

A structure commonly referred to as an interior assembly is mounted within the enclosure. The interior assembly mechanically supports the circuit breakers, which are mounted in selected positions, and electrically connects them to the distribution bus. The interior assembly typically includes a pair of line buses secured by a supporting insulator. The fuses or circuit breakers connect a conductor for each branch to one of the line buses, or to both buses in the case of a two-pole breaker. The interior assembly also includes one or more neutral terminal blocks to which the branch circuit neutral conductors are connected. In some cases, such as for ground fault circuit breakers, a ground terminal block is provided.

The panel board enclosure must have a cover to ensure there are no direct uncovered openings from the interior of the enclosure. In the event of a short circuit for instance, any direct opening would allow dangerous sparks and gases to exit the enclosure, thereby creating a hazard. Additionally, even in the absence of an electrical fault, uncovered openings create an additional risk of unsafe unintentional access to live electrical parts.

A cover, usually defining a window-like opening, is mounted over the open front of the enclosure and secured to the enclosure with screws. A single dead front is mounted over the window-like opening of the cover to provide access to circuit breakers installed therein while blocking any direct uncovered openings proximate to the circuit breakers. The dead front is typically provided with a plurality of generally rectangular removable plates or "knock-outs". As circuit breakers are installed by an electrician into the panel board, the knock-out plates are removed to form generally rectangular apertures on the dead front corresponding to the shape and location of the installed circuit breakers Additionally, a hinged door is often attached to the cover to secure the enclosure providing lockable access to the dead front and the installed breakers that protrude through the apertures in the dead front.

Local electrical codes and industry standards, such as Standard UL 50 for Enclosures and Standard UL 67 for Panel Boards, detail specific requirements related to the fastening of the panel board cover to the enclosure. For example, Standard UL 50 requires that there be at least one cover fastenings located not more than 6 in. (152 mm) from each of the four corners of the enclosure, and the spacing between adjacent cover fastenings must be not more than 24 in. (610 mm).

An illustration of a conventional panel board is shown in exploded view in FIG. 1. A typical panel board 11 consists of an enclosure 21 having a rear wall 41, and four walls 51, 61, 71, 81. Mounted within the enclosure is a structure typically referred to as a panel board interior 91, for mounting at least one circuit breaker 111 with a face 171 with an operating handle 151 extending therefrom. Additionally, the interior 91 comprises at least one distribution bus 121 for electrically connecting the at least one circuit breaker 111 thereto. Also included, within the enclosure 21 at least one of a neutral bus 131 and a ground bus 141 are also mounted as part of the interior 91.

The conventional panel board 11 additionally consists of a cover assembly 161. Often the cover assembly 161 consists of a cover plate 301 defining a window like opening 311, and a single dead front plate 331. The single dead front plate 331 is positioned within window-like opening 311 of cover plate 301 and secured using screws to tabs 361, 371 on cover plate 301. The dead front plate 331 is configured to provide one or more apertures 341 that register with each installed circuit breaker face 171 and operating handle 151 and is configured to allow access thereto, while preventing finger access to electrically live parts. Removable plates 441, commonly referred to as knock-outs or twist-outs, are provided integral to single dead front plate 331 to enable customizing the quantity and location of the one or more apertures 341 as needed on dead front plate 331.

Typically, the cover assembly 161 is secured using screws (not shown) to flanges, 181, 191, 201, 211 formed at right angles to the walls 51, 61, 71, 81 of the enclosure 21. In some cases, the cover assembly is secured to brackets (not shown) mounted with the enclosure 21. A hinged door 221 with latch 241 attaches to the cover plate 301 to cover the dead front plate 331 when in the closed position. In some cases, springs (not shown) positioned between dead front plate 33 1 and the cover 301 are used to provide depth adjustment of the height of dead front plate height 331 within the enclosure 21 and prevent finger access to electrically live parts within the enclosure. In other instances, an adjustable riser (not shown) may be used instead to adjust the height of the panel board interior 91 outward toward the first dead front plate 331.

In some cases, a support structure (not shown), such as a mounting plate for example, may be used to mount the interior 91 at the proper depth within the enclosure 21 and with the required spacing to the enclosure walls 51, 61, 71, 81. The support structure (not shown) is preferably mounted using screws (not shown) to the rear wall 41 of the enclosure 21. The support structure (not shown) is located and configured to position the panel board interior 91, inclusive of any circuit breaker 111 mounted thereon, to maintain at least predetermined minimum spacing to each of the four sidewalls 51, 61, 71, 81. The predetermined spacing dimensions are specified by local electrical codes or industry standards, such as Standard UL 67 for example, and are intended to allow sufficient room for locating and orienting branch circuit cables (not shown) as well as to provide at least minimum distances between electrically live parts and grounded parts, such as the enclosure 21 for example.

The panel board enclosure 21 is usually fixedly mounted on a wall (not shown) or is recessed into a wall (not shown) so that the cover assembly 161 is substantially flush with the wall surface (not shown).

Most conventional panel board enclosures have a generally standard width of approximately 10-14 in. (25.4-35.6 cm), enabling ready installation between studs on walls having standard construction stud spacing of about 16 in. (40.6 cm) on center. Panel board enclosures are known to vary greatly in the height depending on the manufacturer and the number of branch circuits supported as well as other factors.

There is often a need to update or replace older panel boards that have been previously installed in the field, such as where an updated panel board with circuit breakers is desired as a replacement for a fuse panel board, or for instance, where branch circuits need to be added. For cost and convenience reasons, such as for example where a panel board is flush mounted in a concrete wall, replacing the entire panel including the enclosure would require significant effort and cost, it is frequently preferable to replace or retrofit the installed panel board without removing or replacing the panel board enclosure.

Often the desired new replacement panel board interior is physically smaller than the prior panel board interior. For example, many older style 1 in. (25.4 cm) wide circuit breakers can be replaced by identically rated newer ½ in. (1.27) wide circuit breakers. Conversely, in many cases, additional branch circuit breakers may be desirable, requiring a somewhat larger panel board interior that still fits within the original enclosure.

The disparity in size between the original panel board interior and the retrofit panel board interior has required additional time and cost to ensure proper fit of the new interior in the previously installed enclosure, proper alignment of the new circuit breakers, and compliance with local and UL Standards. For example, retrofitting new interiors and circuit breakers into old enclosures has required careful measurements, customized new supports, and shimming of the replacement interior to properly adjust the depth of the new circuit breakers within the enclosure and properly register the new circuit breakers with the dead front openings, while maintaining all required UL spacing and clearances.

There is a need, therefore, for an improved retrofit panel board and method of selecting a panel board. It is desirable to have an improved panel board retrofit kit that is capable of Listing by Underwriters Laboratories, Inc. by ensuring that all requirements of Standard UL 50 and UL 67 are satisfied when properly installed, thus avoiding the need and cost for an in-field inspection after installation by an Underwriters Laboratories field inspector.

Accordingly, it has been determined by the inventors of the present disclosure that there is a continuing need for panel board retrofit kits and methods of selecting that overcome, alleviate, and/or mitigate one or more of the aforementioned and other disadvantages of prior art systems.

BRIEF SUMMARY OF THE INVENTION

It will be understood that other terms such as control center, load center, switch panel, lighting panel, and the like can be used interchangeably with the term "panel board". Typically such distinctions refer only to the electrical rating or the components used therein. It will be understood that the term panel board shall be used herein to apply to other such terms as control panel, load center, switch panel, lighting panel, and the like.

In an exemplary embodiment of the present invention, a panel board retrofit kit for replacing a panel board having a switching device in an enclosure is provided, said panel board retrofit kit comprising a first panel board dead front plate configurable to have a first aperture; and a second panel board dead front plate configurable to have a second aperture, said second aperture of said second panel board dead front plate being configurable to overlap at least a portion of said first aperture of said first panel board dead front In another exemplary embodiment of the present invention, a panel board retrofit kit for replacing a panel board having a switching device in an enclosure is provided, said panel board retrofit kit comprising a cover; and a first panel board dead front plate attachable to said cover and configurable to have a first aperture; and a second panel board dead front plate attachable to said first panel board dead front plate and configurable to have a second aperture, wherein said second aperture of said second panel board dead front plate is positionable to overlap at least a portion of said first aperture of said first panel board dead front In yet another exemplary embodiment of the present invention, a method is provided for providing a panel board retrofit kit for replacing a panel board having a switching device in an enclosure, said enclosure having a known height dimension, said method comprising offering a plurality of panel board retrofit kit cover assemblies each comprising a first dead front, said offering being based at least in part on said enclosure height dimension; receiving a selection of a panel board retrofit kit cover assembly selected from said plurality of panel board retrofit kit cover assemblies, offering a plurality of available panel board retrofit kit interior assemblies each comprising a second retrofit panel board dead front, said offering being based at least in part on said selected cover assembly, receiving a selection of a panel board retrofit interior assembly selected from said plurality of panel board retrofit kit interior assemblies, providing a panel board retrofit kit comprising said selected panel board retrofit kit cover assembly and said selected panel board retrofit interior assembly In a further exemplary embodiment of the present invention another method is provided for providing a panel board retrofit kit for replacing a panel board having a switching device in an enclosure, said enclosure having a known height dimension, said method comprising offering a plurality of panel board retrofit kit cover assemblies each comprising a first dead front, said offering being based at least in part on said enclosure height dimension, receiving a selection of a panel board retrofit kit cover assembly selected from said plurality of panel board retrofit kit cover assemblies, offering a plurality of available panel board retrofit kit interior assemblies each comprising a second retrofit panel board dead front, said offering being based at least in part on said selected cover assembly, receiving a selection of a panel board retrofit interior assembly selected from said plurality of panel board retrofit kit interior assemblies, providing a panel board retrofit kit comprising said selected panel board retrofit kit cover assembly and said selected panel board retrofit interior assembly.

The above brief summary sets forth rather broadly the more important features of the present invention in order that the detailed description thereof that follows may be better understood, and in order that the present contributions to the art may be better appreciated. In this respect, before explaining several embodiments of the invention in detail, it will be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

Reference is now made briefly to the accompanying drawings, in which.

DETAILED DESCRIPTION OF THE INVENTION

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Figure 1:
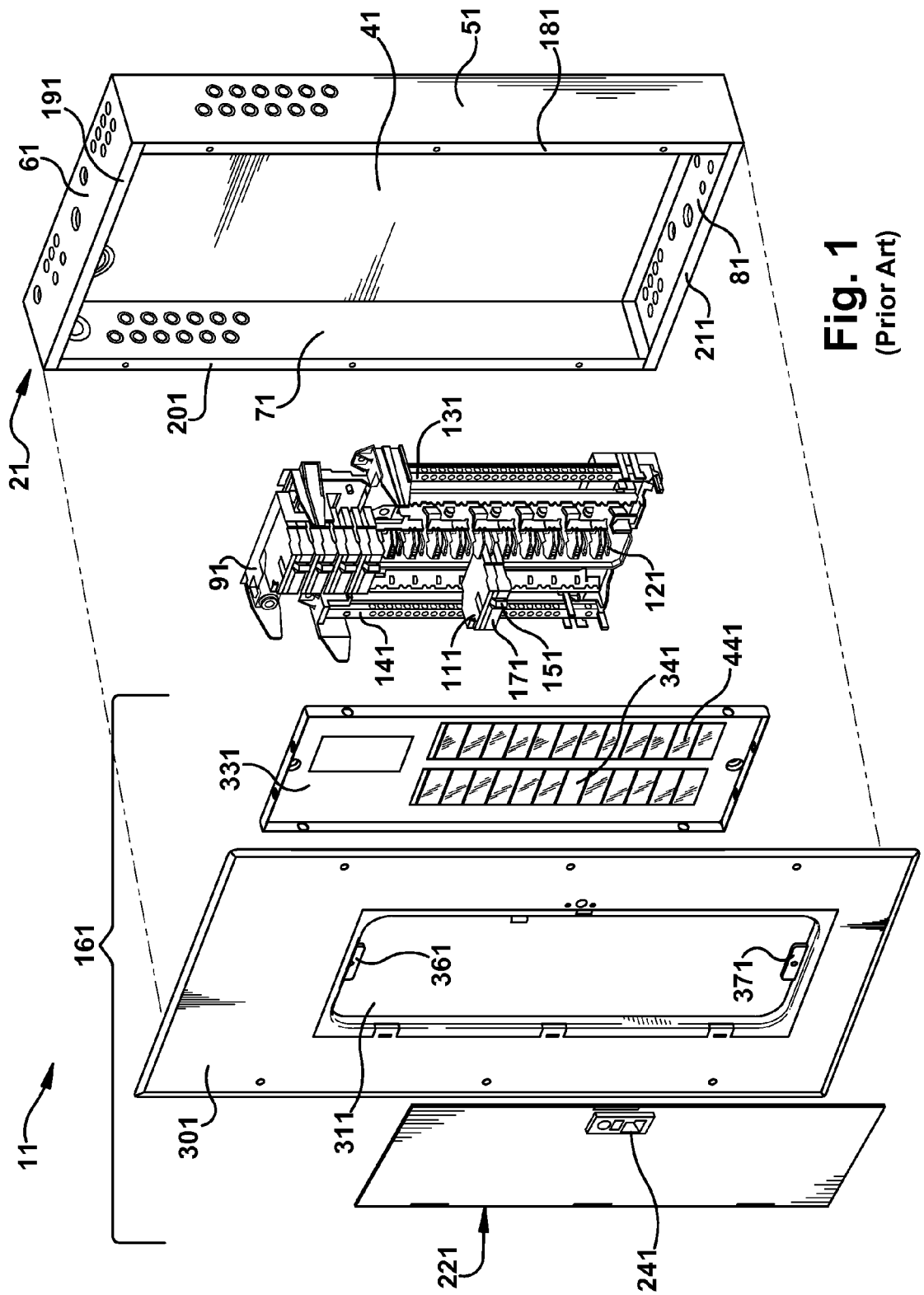
FIG. 1 illustrates an exploded view of a conventional panel board known in the art, such as one requiring replacement, and a typical panel board enclosure.
Figure 2:
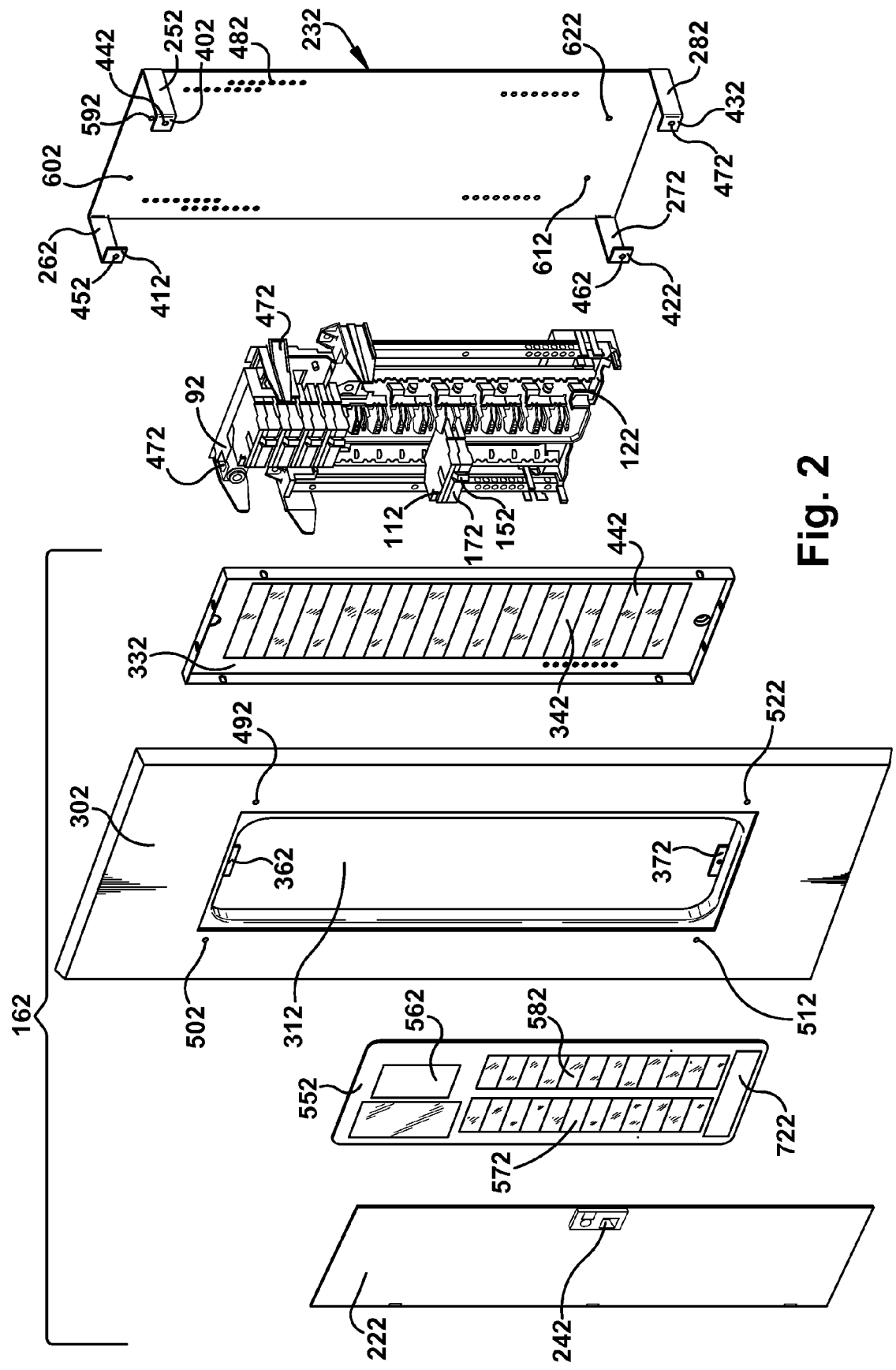
FIG. 2 illustrates an exploded view of an embodiment of the retrofit panel board of the present invention.

Referring now to FIG. 2 there is an exploded view of an exemplary embodiment of panel board retrofit kit of the present invention which is configured to be installed in the panel board enclosure 21 of FIG. 1.

Figure 3:
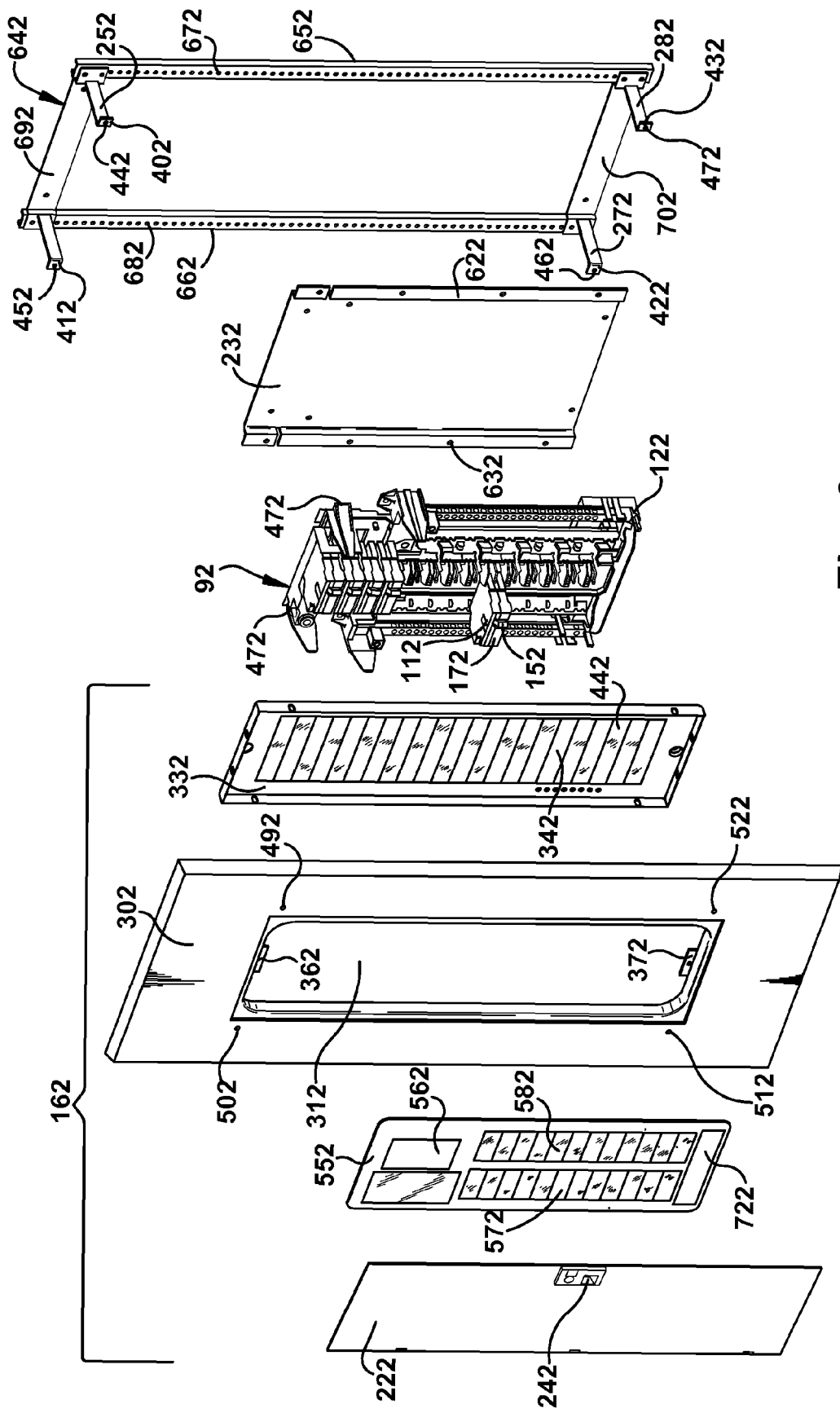
FIG. 3 illustrates an exploded view of an alternative embodiment of the retrofit panel board of the present invention.

Embodiments of the present invention shown in FIGS. 2 and 3 are now described with occasional reference back to FIG. 1. A retrofit panel board interior support structure 232, such as a mounting plate for example, for mounting the retrofit panel board interior 92 at the proper depth within an enclosure 21 (FIG. 1) and with the required spacing to the enclosure walls 51, 61, 71, 81 (FIG. 1) is provided. In one embodiment, the support structure 232 is mounted directly to the rear wall 41 of the enclosure 21 (FIG. 1) using screws (not shown). In this instance, the plate is configured with a set of lanced or extruded through-holes 592, 602, 612, 622 which provide convenient locations for the mounting screws (not shown) and add about 0.187 in. (4.75 mm) to the thickness of the support structure 232 in the lanced location. Brackets 252, 262, 272, 282 are provided integral to support structure 232 for securing a retrofit panel board cover plate 302. The number of brackets provided preferably increases with increasing panel board cover plate 302 height and in accordance with the spacing requirements for fasteners as required by UL Standards as described below. Brackets 252, 262, 272, 282 are configured with surfaces 402, 412, 422, 432 to provide mounting locations for securing retrofit panel board cover 302 preferably with threaded fasteners such as screws (not shown). Preferably the surfaces 402, 412, 422, 432 include threaded apertures 442, 452, 462, 472 to capture the threaded fasteners such as screws (not shown) securing retrofit panel board cover 302 to brackets 252, 262, 272, 282

A retrofit panel board interior 92, configured to mount at least one circuit breaker 112 with a face 172 with an operating handle 152 extending therefrom is also provided. The retrofit panel board interior 92 comprises at least one distribution bus 122 for electrically connecting the at least one circuit breaker 112 thereto. The retrofit panel board interior 92 is selected to fit generally centered within the intended enclosure 21 (FIG. 1) in the field and ensure all spacings and clearances, such as for example wire bending space and gutter space, are maintained as required by local code and applicable Underwriters Laboratories Inc. standards. The retrofit panel board interior 92 is secured by fasteners (not shown) such as for example, screws, to retrofit panel board interior support structure 232. In one embodiment, the retrofit panel board interior support structure 232 additionally includes a plurality of apertures 482 providing a selection of locations for adjustably mounting the retrofit panel board interior 92 thereto with threaded fasteners.

Preferably, the retrofit panel board interior 92 is provided with a plurality of apertures 472 configured to capture fasteners such as screws and align with the selectable apertures 482 on retrofit panel board interior support structure 232 for adjustably mounting the retrofit panel board interior 92 thereto.

It will be understood that the retrofit panel board interior 92 may be provided in various configurations, such as for example with the retrofit panel board interior support structure 232 fixedly attached or integral to the retrofit panel board interior 92, or alternatively with the retrofit panel board interior support structure 232 provided as a separate structure for field installation or assembly, without departing from the scope of the invention.

A retrofit panel board cover plate 302 defining a window-like opening 312 and configured to attach to brackets 252, 262, 272, 282 is provided as part of a retrofit panel board cover assembly 162 including a first dead front plate 332. Preferably, cover plate 302 comprises apertures 492, 502, 512, 522 alignable with the preferably threaded apertures 442, 452, 462, 472 of brackets 252, 262, 272, 282 having mounting surfaces 402, 412, 422, 432 for securing retrofit panel board cover 302 with threaded fasteners such as screws (not shown). Additionally, a hinged door 222 attachable to the cover plate 302 is preferably provided. In the preferred embodiment, the cover plate 302 fastening apertures 492, 502, 512, 522 and corresponding brackets 252, 262, 272, 282 with apertures 442, 452, 462, 472 of configured to ensure the spacings for fastenings as required by code or UL Standards such as for instance, the UL requirement that there shall be one or more cover fastenings located not more than 6 in. (15.2 cm) from each of the four corners of the enclosure 21 (FIG. 1), are maintained during installation of the retrofit panel board. The locations of the apertures 492, 502, 512, 522 on cover plate 302 are preferably determined by calculating the difference between the overall height dimension "H" of the retrofit panel board cover 302, and subtracting a between-bracket distance, "D" (i.e., between the uppermost and lowermost bracket apertures), and then dividing the difference (H-D) by 2 to verify that (H-D)/2 is 6 in. (15.2 cm) or less. For example, for an enclosure measuring 26 in. (66 cm) in height, a support structure 23 having between-bracket spacing dimension measuring 17.5 in. (44.5 cm) is selected, then the distance between the enclosure 21 (FIG. 1) and the fasteners (not shown) securing cover plate 302 to the corresponding brackets 252, 262, 272, 282, (H-D)/2=4.75 in.(12.1 cm). Thus, the maximum distance of 6 in.(15.2 cm). from fastening to enclosure 21 (FIG. 1) corner, as required by Standard UL 50, is maintained.

The first dead front plate 332 configurable to provide an aperture 342 to register with the at least one circuit breaker face 172 and operating handle 152 installed on retrofit panel board interior 92, and allow access thereto in cooperation with a second dead front plate 552, described below. The first dead front plate 332 is configured to fit within the window-like opening 312 of cover plate 302 and secured using screws (not shown) to tabs 362, 372 on cover plate 302. Removable plates 442, such as for example knock-outs or twist-outs, are provided integral to first dead front plate 332 to enable configuring aperture 342 on first dead front 332 to register with every at least one circuit breaker 112 installed in the panel board retrofit interior 92 in the field. Only those knock-out plates 442 that correspond to and register with the at least one circuit breaker 112 installed in the retrofit panel board interior 92 are removed.

However, because the retrofit panel board interior 92 is adjustably positionable on support structure 232 and within the recipient enclosure 21 (FIG. 1), the aperture 342 formed by removal of knockout plates 442 on first dead front plate 332, may not properly register with the at least one circuit breaker 112 installed in the retrofit panel board interior 92, and could result in direct uncovered openings from the interior of the enclosure 21 (FIG. 1), To overcome for any such lack of alignment, and to ensure that the retrofit panel board has no direct uncovered openings from the interior of the enclosure 21 (FIG. 1), the panel board retrofit kit of the present invention is additionally provided with the second dead front plate 552. The second dead front plate 552 is configured with one or more apertures 572 configured to be registerable with every circuit breaker 112 installable in the selected retrofit panel board interior 92. The apertures may be pre-formed or alternatively, formed by removal of knockout plates 562, 582 as needed. The second dead front plate 552 is attachable, preferably with screws, to the outer face of first dead front plate 332 and positionable thereon such that the aperture 342 and the one or more apertures 562 cooperate to register with every installed at least one circuit breaker face 172 and operating handle 152 in the retrofit panel board interior 92. Moreover, the combination of the first dead front plate 332, the second dead front plate 552, and cover plate 302 ensure that the retrofit panel board has no direct uncovered openings from the interior of the enclosure, and each circuit breaker 112 handle 152 is accessible for manual operation.

In one embodiment, the second dead front plate 552 is further configurable to include a label 772, such as for example a rating label, a date code label, or any other label required to comply with local codes and UL Standards. It will be understood by those of ordinary skill in the art, that the label 772 can be pre-applied in the factory, or affixed in the field at the time of installation.

In some instances such as where there is limited depth in the existing enclosure 21 (FIG. 1), it may be desirable to eliminate as much offset of the retrofit panel board support structure 232 from the rear wall 41 of the enclosure 21 (FIG. 1), such as for example the offset due to the lanced support plate mounting holes 592, 602, 612. In other instances, it may also be desirable to provide mounting brackets 252, 262, 272, 282 that are separate from the support structure 232 for securing retrofit panel board cover plate 302.

Referring now to FIG. 3 there is shown an alternative embodiment of the retrofit panel board kit of the present invention having a support frame assembly 642 attachable to the rear wall 41 of the enclosure 21 (FIG. 1), preferably by screws (not shown) for mounting the support structure 232.

The support frame assembly 642 includes a pair of vertical base members 652, 662 each configured with a set of holes 672, 682 each set arranged as parallel rows. The support frame assembly 642 includes a pair of horizontal crossbars 692, 702 configured generally perpendicular to the vertical base members 652, 662 and connected at each end to a respective one of the vertical base members 652, 662. In one embodiment, the support structure 232 is configured with a generally U-shaped cross-section with leg portions 622, 632. The support structure 232 is fastened to the support frame assembly 642 by fasteners such as screws or rivets (not shown) through leg portions 622, 632 that engage selected ones of the sets of holes 672, 682 of the base members 652, 662. By selecting appropriate ones of the set of holes 672, 682, vertical adjustment of the support plate enabled within the enclosure to ensure the retrofit panel board interior 92 is properly fit within the intended enclosure 21 (FIG. 1), and ensure all spacings and clearances, such as for example wire bending space and gutter space, are maintained as required by local code and applicable Underwriters Laboratories Inc. standards.

Figure 4:
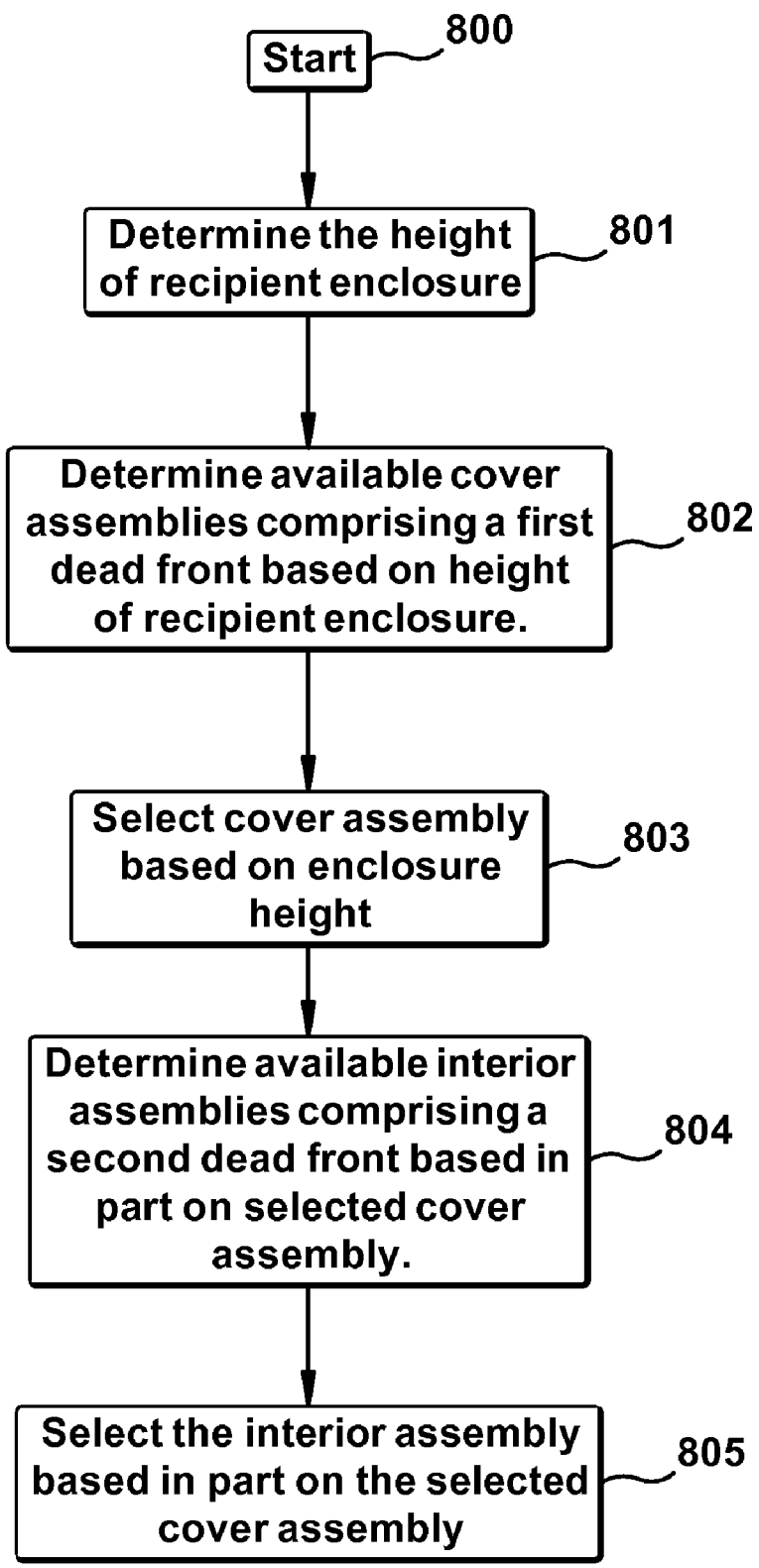
FIG. 4 illustrates a flow chart of an exemplary method for selecting a retrofit panel board of type illustrated in FIGS. 2 and 3.

Referring now to FIG. 4, wherein a flow chart is shown illustrating an exemplary embodiment of a process for selecting a panel board retrofit kit, such as for example the panel board retrofit kit of FIG. 2, selectable from a plurality of panel board retrofit kits (not shown) and installable in any one of a plurality of panel board enclosures (not shown) within a predetermined range of enclosure height dimensions.

The method starts with an initial step at 801 wherein the height of the intended recipient panel board enclosure 21 (FIG. 1), is determined. It will be understood that the panel board enclosure 21 (FIG. 1), height dimension can be determined in a number of ways, such as, for example, by directly measuring in the field, or by looking up in a table based on manufacturer's catalog numbers. The panel board enclosure 21 (FIG. 1) height dimension is then used, as shown at step 802, to determine the available panel board cover assemblies, comprising a panel board cover plate 302 and a first dead front plate 332. The determination of available panel board cover assemblies can be aided by, for example a chart such as the exemplary chart of FIG. 6, which will be further described below.

Figures 5, 6:
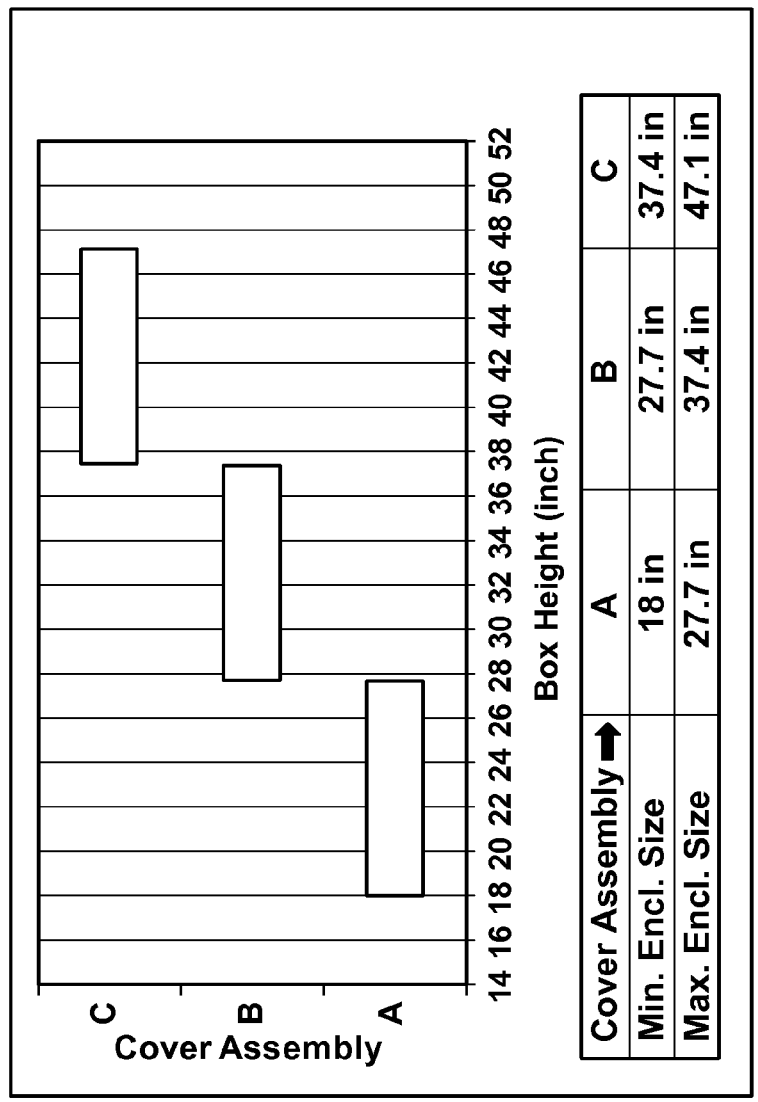
FIG. 5 illustrates an exemplary chart that may be used for selecting a cover assembly of an embodiment of the retrofit panel board as illustrated in FIGS. 2 and 3, following the process of FIG. 4.
FIG. 6 illustrates an exemplary table that may be used for selecting an interior assembly of the retrofit panel board as illustrated in FIGS. 2 and 3 following the process of FIG. 4.

As shown in FIG. 5, a selection of 3 panel board cover assemblies are available for use on panel board enclosures having a range of heights, from about 18 in. (45.7 cm) to 47.1 in.(119.6 cm) In this example, and as shown in the chart of FIG. 5, panel board cover assembly "A" can be properly installed on a panel board enclosure 21 (FIG. 1 having a height within a range from about 18 in. (45.7 cm) to 27.7 in.(70.4 cm) and panel board cover assembly "B" can be properly installed on a panel board enclosure 21 (FIG. 1 having a height within a range, from about 27.7 in.(70.4 cm) to 37.4 in.(95 cm), and panel board cover assembly "C" can be properly installed on a panel board enclosure 21 (FIG. 1 having a height within a range, from about 37.4 in.(95 cm) to 47.1 in.(119.6 cm). It will be understood that these dimensions are by way of example only and different numbers and combinations of panel board cover assemblies can be used, as well as a wider or narrower range of enclosure height dimensions can be supported, without departing from the scope of the invention.

Once the retrofit panel board cover assemblies available for proper installation are determined, one of the available panel board cover assemblies is then selected as indicated at step 803.

The selected retrofit panel board cover assembly 162 is then used, as shown at step 804, to determine the available retrofit panel board interior assemblies, comprising the panel board interior 92, support structure 232, and second dead front plate 552. The determination of available retrofit panel board interior assemblies can be aided by, for example a chart such as the exemplary chart of FIG. 6.

As shown in FIG. 6, a selection of six retrofit panel board interior assemblies are available for use with the three retrofit panel board cover assemblies identified in the exemplary table of FIG. 5. In this example, and as shown in the chart of FIG. 6, retrofit panel board interior "1", configured to support 12 branch circuits with a maximum combined ampere rating of 125 Amperes, can be properly installed in a panel board enclosure 21 (FIG. 1) having a range of heights, from about 18 in. (45.7 cm) to 47.1 in.(119.6 cm) and with any of the available retrofit panel board cover assemblies listed in the exemplary chart of FIG. 5. On the other end of the chart, for example, retrofit panel board interior assembly "6", configured to support 40 branch circuits with a maximum combined ampere rating of 200 A, can be properly installed only in a panel board enclosure 21 (FIG. 1) having a range of heights, from about 37 in. (94 cm) to 47.1 in. (119.6 cm), and only with retrofit panel board cover assembly "C" as listed in the exemplary chart of FIG. 6.

It will be understood that these dimensions and selections are by way of example only and different numbers and configurations of retrofit panel board interior assemblies can be used, as well as a wider or narrower range of enclosure height dimensions can be supported, without departing from the scope of the invention.

Once the available retrofit panel board interior assemblies available for proper installation are determined, one of the available panel board interior assemblies is then selected as indicated at step 805.

Figure 7:
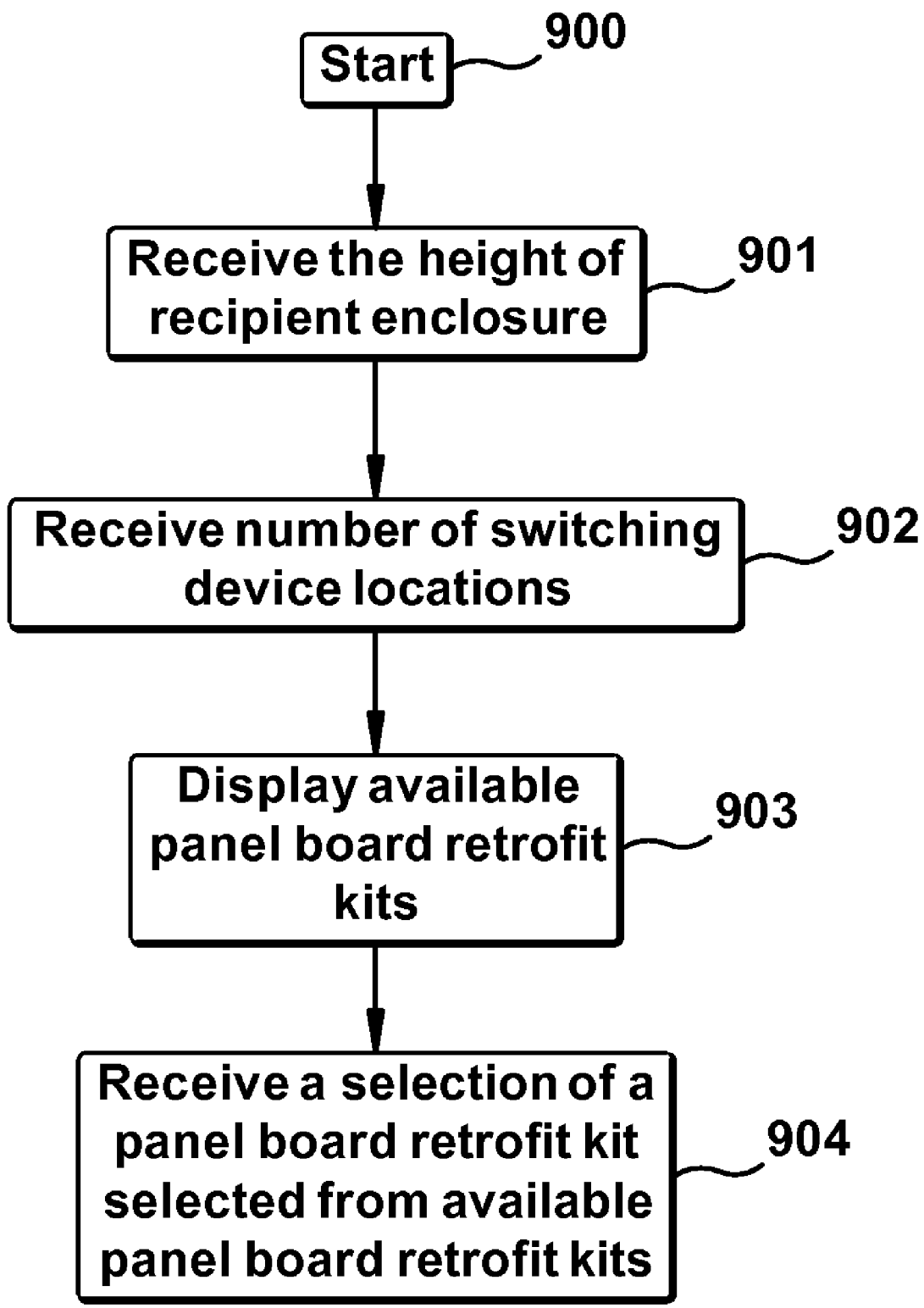
FIG. 7 illustrates a flow chart of an alternative embodiment of a method for identifying a retrofit panel board of type illustrated in FIGS. 2 and 3.

Referring now to FIG. 7, wherein a flow chart is shown illustrating an exemplary embodiment of a process for identifying a panel board retrofit kit, such as for example the panel board retrofit kit of FIG. 2, selectable from a plurality of panel board retrofit kits (not shown) and installable in any one of a plurality of panel board enclosures (not shown) within a predetermined range of enclosure height dimensions.

The method starts with an initial step at 901 wherein the height of the intended recipient panel board enclosure 21 (FIG. 1), is received. It will be understood that the panel board enclosure 21 (FIG. 1), height dimension can be determined in a number of ways, such as, for example, by looking up in a table based on manufacturer's catalog numbers, or by a measurement in the field. Additionally, as shown in step 902, an indication of a number of switching device locations or circuits desired for the retrofit panel board is also received. It will be understood that the switching device locations or circuits may be further designated as either main or branch, and may additionally include an indication of one or more poles for each switching device.

The panel board enclosure 21 (FIG. 1) height dimension provided in step 901, and the number of switching device locations provided in step 902 are used, as shown at step 903, to display the available panel board retrofit kits comprising a first retrofit panel board dead front 332 and a second retrofit panel board dead front 552. The displaying of available panel board cover assemblies can be aided by, for example, charts such as the exemplary charts of FIG. 6 and FIG. 7.

A selection of a panel board retrofit kit, selected from the number of available panel board retrofit kits displayed in step 903, is then received as indicated in step 904.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A panel board retrofit kit for replacing a panel board in an enclosure, the panel board having a switching device installable thereon, said panel board retrofit kit comprising:
   a cover plate configured to be attached to said enclosure, said cover plate comprising an opening sized and disposed to provide operative access to said switching device;
   a first dead front plate configured to cooperate with said cover plate said first dead front plate configurable to have an first aperture, said first aperture sized and disposed to provide operative access to said switching device; and
   a second dead front plate configured to be attached to said first dead front plate, and configurable to have a second aperture, said second aperture being configurable to overlap at least a portion of said first aperture of said first panel board dead front plate.

2. The panel board retrofit kit of claim 1, wherein said first aperture of said first dead front plate is formable by removal of a removable plate.

3. The panel board retrofit kit of claim 1, wherein said second dead front has a surface configured to receive a label.

4. The panel board retrofit kit of claim 1, wherein said second dead front plate is attachable to said first dead front plate with threaded fasteners.

5. The panel board retrofit kit of claim 1, wherein said second aperture of said second panel board dead front plate and said first aperture of said first panel board dead front plate are positionable to provide access to said switching device.

6. The panel board retrofit kit of claim 1, further comprising a support structure, wherein said support structure comprises a mounting plate.

7. The panel board retrofit kit of claim 6 wherein said support structure further comprises a mounting frame.

* * * * *